United States Patent [19]

Foley

[11] 4,282,160
[45] Aug. 4, 1981

[54] NOVEL TRIARYLMETHANE COMPOUNDS

[75] Inventor: James W. Foley, Andover, Mass.

[73] Assignee: Polaroid Corporation, Cambridge, Mass.

[21] Appl. No.: 152,181

[22] Filed: May 22, 1980

[51] Int. Cl.$^3$ .................. C07C 15/16; C07D 455/06; C07C 79/22; C07C 79/28; C09B 11/12

[52] U.S. Cl. ..................................... 260/388; 260/390; 260/395; 260/326.47; 260/333; 568/706; 568/707; 568/709; 568/711; 546/94; 546/95; 546/138; 546/239; 430/520; 430/517; 430/220; 430/560; 544/59; 544/169

[58] Field of Search ............ 568/706, 707, 709, 711, 568/306; 260/388, 390, 395, 239, 121; 546/94, 95, 220; 430/520, 517, 566, 560

[56] References Cited

U.S. PATENT DOCUMENTS

| | | | |
|---|---|---|---|
| 1,403,888 | 1/1922 | Alioth et al. | 260/395 |
| 1,879,537 | 9/1932 | Schneider | 430/517 |
| 1,994,876 | 3/1935 | Schneider et al. | 430/520 |
| 2,350,090 | 5/1944 | Beilenson | 430/517 |
| 3,005,711 | 10/1961 | Burgardt et al. | 430/520 |
| 3,406,069 | 10/1968 | Overmah | 430/517 |
| 3,615,546 | 10/1971 | Depoorter et al. | 430/520 |
| 4,139,381 | 2/1979 | Bloom et al. | 430/520 |
| 4,186,001 | 1/1980 | Foley | 430/220 |
| 4,195,180 | 3/1980 | Borror et al. | 430/510 |

FOREIGN PATENT DOCUMENTS 166530 9/1922 United Kingdom ..................... 260/395

Primary Examiner—Patrick Garvin
Assistant Examiner—Raymond K. Covington
Attorney, Agent, or Firm—Sybil A. Campbell

[57] ABSTRACT

The present invention is concerned with novel compounds useful in photographic products and processes comprising triarylmethane dyes possessing in their triaryl structure a 4'-oxo-1'-naphthylidene (or a 4'-oxo-1'-phenylidene) moiety and a phenyl moiety substituted in the ortho-position to the central carbon atom with the group

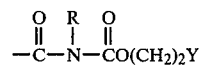

wherein R is an alkyl group or a phenyl group, unsubstituted or substituted with a solubilizing group and Y is an electron-withdrawing group.

9 Claims, No Drawings

NOVEL TRIARYLMETHANE COMPOUNDS

BACKGROUND OF THE INVENTION

1. Field of the Invention

This invention relates to novel chemical compounds, and more particularly, it relates to novel triarylmethane compounds which are useful, e.g., as light-screening dyes in photographic products and processes.

2. Description of the Prior Art

It is well known that photographic film, and especially multicolor films, may and generally do vary from lot to lot, notwithstanding efforts to "repeat" previous films. Manufacturers of multicolor photographic films have developed a number of procedures to minimize the effects upon the final multicolor image of unavoidable variations in the manufacturing operations. These variations are reflected primarily in shifts in color balance as reflected in mismatching of the D log E curves of the individual red, green and blue exposures. Equipment used to coat multicolor films is highly precise but variations between intended coverage of silver halide and/or the dye image-forming materials do occur. Repeat batches of silver halide emulsions may, and usually do, vary in their photographic response. Individual layers may be dried to slightly different degrees. Films are stored for a period of time after coating to allow the films to "age", so that changes in sensitometry following coating have an opportunity to reach a plateau prior to sale. If the film is designed to be developed by a photofinisher or in a darkroom, processing of the exposed multicolor film is controlled within very narrow limits, typically within plus or minus a half degree of a prescribed temperature, in order to minimize sensitometric variations from film to film. Where the multicolor film is of the negative type, an opportunity to adjust the sensitometry occurs in printing the desired final positive image, during which operation the printing exposure may be appropriately color filtered.

The basic source of sensitometric variations noted above exist also in multicolor diffusion transfer films, with the added complication that once the film is shipped, the sensitometric properties are essentially fixed. The opportunity for adjustment provided in darkroom processing, practically speaking, is unavailable for users of self-developing films. While professional and advanced amateur photographers may be skillful enough to utilize color correction filters to at least partially "rebalance" the color balance, ordinary users of the film would only be confused by such additional operations.

It is well known to use light-screening dyes in photographic elements. Such a dye may be incorporated as a filter dye in a light-sensitive emulsion layer(s) or in a layer coated over one or more light-sensitive emulsion layers or between two differently color-sensitized emulsion layers to modify the light record in the emulsion layer or to control the spectral composition of light falling on the underlying light-sensitive layer, or it may be incorporated as an antihalation dye in a non-light-sensitive layer positioned on either side of a support carrying the light-sensitive layer(s).

The dyes employed for these purposes, in addition to having the requisite spectral absorption characteristics for their intended use, should not have any adverse effect on the properties of the light-sensitive emulsion layer(s), and also, should be capable of being decolorized or removed during photographic processing so as not to leave stain in the processed photographic element. In photographic processes where the dye is removed by being dissolved in a processing solution, it is usually preferred that the dye also decolorize in order to avoid contamination of the processing solution and to prevent staining from residual dye in the processed light-sensitive element.

Though various classes of dyes have been proposed for use in antihalation and color correction filter layers, the dyes heretofore employed have not been altogether satisfactory. Some of the dyes tend to reduce sensitivity, fog or exert other adverse effect on the light-sensitive material. However, the major drawback of previously employed dyes is their tendency to cause stain due to incomplete decolorization or reversal of some of the decolorized form to the original colored form. For example, some classes of dyes rely on the presence of a reagent, such as, a sulfite for "bleaching", i.e., decolorization and unless the dyes are removed from the light-sensitive material during or after processing, their color may reappear in time.

Among the classes of light-screening dyes used previously are the triarylmethanes. For example, U.S. Pat. Nos. 1,879,537; 1,994,876; 2,350,090 and 3,005,771 disclose the use of fuchsone-type dyes in antihalation layers, and U.S. Pat. Nos. 3,406,069 and 3,615,548 are concerned with the metal chelates of fuchsone dyes as antihalation dyes. These and other types of trairylmethane dyes suffer from one or more of the drawbacks discussed above, and in particular, prior dyes of this type have been difficult to keep decolorized at the pH's normally encountered during processing subsequent to "bleaching" and in the final product.

U.S. Pat. No. 4,139,381 of Stanley M. Bloom, Alan L. Borror and James W. Foley is directed to the use of certain 3,3-disubstituted sulfam(na)phthaleins as photographic optical filter agents and filter agent precursors. As described therein, one of the 3-substituents is a 4'-hydroxy-1'-phenyl moiety or a 4'-hydroxy-1'-naphthyl moiety, the other of the 3-substituents is a phenyl moiety or a naphthyl moiety, and the N atom of the sulfam(na)phthalein ring is substituted with a carbonyl moiety that undergoes an irreversible cleavage reaction is alkaline solution. These compounds are initially colorless, i.e., they do not absorb visible radiation intended to expose the photosensitive material but upon contact with base form a colored compound capable of absorbing such radiation thereby preventing further exposure of said photosensitive materials by ambient light, which colored compound after remaining in contact with said base for a given time forms a colorless compound as a result of the irreversible cleavage of the carbonyl moiety.

Copending U.S. patent application Ser. No. 957,161 of James W. Foley filed Nov. 2, 1978 now U.S. Pat. No. 4,186,001, and copending U.S. patent application Ser. No. 836,067 of Alan L. Borror et al filed Sept. 23, 1977 now U.S. Pat. No. 4,195,180, also are concerned with N-carbonyl-3,3-disubstituted sulfam(na)phthaleins. The sulfam(na)phthaleins disclosed in these applications are initially colored, and when contacted with base, they are converted to a form having a different color, which form decolorizes by undergoing an irreversible cleavage reaction after remaining in contact with said base for a given time. U.S. patent applications Ser. Nos. 106,902 and 106,901 filed Dec. 26, 1979 disclose xanthene dyes which also decolorize by irreversible cleavage in base, and like the initially colored sulfam(na)phthaleins, offer advantages over prior light-screening dyes because of their ability to decolorize completely and irreversibly to a substantially inert colorless product.

The present invention is concerned with another class of compounds which also find utility as photographic light-screening dyes and which also are free from the deficiencies associated with the dyes previously used for this purpose. The subject triarylmethane dyes, which will be defined with greater particularity hereinafter, are efficient absorbers of radiation within a predetermined range in the visible range of 400 to 700 nm, may be incorporated in gelatin or other processing composition-permeable colloidal binding agents and are decolorized at an alkaline pH to yield a colorless product. Because of their ability to decolorize completely are irreversibly in base without requiring an additional reagent, such as, a sulfite for the "bleaching" reaction and because the new colorless product produced upon irreversible cleavage remains colorless in aqueous solution over a pH range of 1 to 14, the cleavage product may be retained in the photographic light-sensitive element without the possibility of color reappearing in time. Besides being non-staining, the compounds usually are substantially inert with respect to the light-sensitive material and thus, may be positioned in a layer adjacent to a silver halide emulsion layer or directly incorporated into an emulsion layer without having any adverse effect on the properties of the emulsion.

SUMMARY OF THE INVENTION

It is therefore the primary object of the present invention to provide novel triarylmethane compounds.

It is another object of the present invention to provide triarylmethane compounds useful as light-screening dyes in photographic products and processes.

Other objects of this invention will in part be obvious and will in part appear hereinafter.

This invention accordingly comprises the products and compositions possessing the features, properties and the relation of elements which are exemplified in the following detailed disclosure and the scope of the application of which will be indicated in the claims.

According to the present invention, novel triarylmethane compounds are provided which possess in their triaryl structure a 4'-oxo-1'-naphthylidene (or a 4'-oxo-1'-phenylidene) moiety and a phenyl moiety substituted in the ortho-position to the central carbon atom with the carboxamido group,

wherein R is an alkyl group or a phenyl group, unsubstituted or substituted with a solubilizing group and Y is an electron-withdrawing group.

For a fuller understanding of the nature and objects of the present invention, reference should be had to the following detailed description.

DETAILED DESCRIPTION OF THE INVENTION

The novel compounds provided by the present invention may be represented by the formula

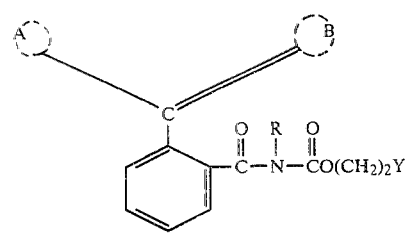

wherein A is a phenyl moiety or a naphthyl moiety; B is a 4'-oxo-1'-phenylidene moiety or a 4'-oxo-1'-naphthylidene moiety; R is an alkyl group or a phenyl group, both of which may be unsubstituted or substituted with a solubilizing group, and Y is an electron-withdrawing group. By "electron-withdrawing group" is meant a group having a positive sigma value as defined by Hammett's Equation.

As noted above, the subject compounds are initially colored, i.e., capable of absorbing visible radiation, and at an alkaline pH, are converted to a colorless product by undergoing an irreversible cleavage reaction with base. The colorless product formed is a new compound which is different from and non-reversible to the colored compound by a change in pH. In particular, it is the

group substituted on the phenyl moiety in a position ortho to the central carbon atom that undergoes the irreversible cleavage reaction in alkaline solution that is complete within a predetermined time at a predetermined alkaline pH to give the new colorless compound, namely, the cyclic carboxamide, as illustrated by the following wherein the A moiety is 4'-hydroxyphenyl and the B moiety is 4'-oxo-phenylidene.

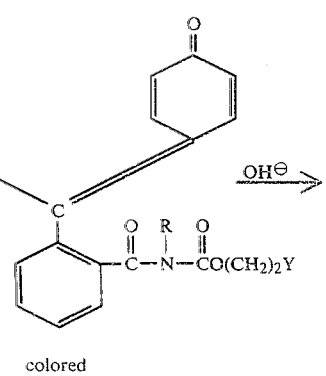

colored

colorless

It will be appreciated that the by-products formed upon cleavage of the group also are colorless. Because the said cleavage reaction proceeds at a faster rate at higher pH's, the subject compounds are particularly suitable for use in photographic processes where the pH is maintained above about 10 at least for the time necessary for decolorization to the corresponding cyclic carboxamide.

It will be understood that the A moiety and/or the B moiety of the compounds represented in formula I above may contain one or more substituents in addition to those specified, which substituents should not interfere with the intended use of the compounds.

Typical substituents include branched or straight chain alkyl, such as, methyl, ethyl, isopropyl, n-butyl, n-propyl, t-butyl, hexyl, octyl, dodecyl, hexadecyl, octadecyl and eicosanyl; aryl, such as phenyl and naphthyl; alkaryl and aralkyl, preferably, alkyl-substituted phenyl and phenylsubstituted alkyl, such as p-ethylphenyl, p-octylphenyl, p-dodecylphenyl, benzyl, phenethyl, phenylhexyl and phenyldodecyl; alkoxy, such as, methoxy, ethoxy, butoxy, octadecyloxy, 1-ethoxy-2-($\beta$-ethoxyethoxy); aryloxy, such as, phenoxy, benzyloxy and naphthoxy; alkoxyalkyl, such as, methoxymethyl, ethoxymethyl, and dodecyloxyethyl; halo, such as, fluoro, bromo and chloro; trihalomethyl; such as, trifluoromethyl and trichloromethyl; sulfonamido (—NH—SO$_2$R° wherein R° is alkyl, aryl, alkaryl or aralkyl); sulfamoyl (—SO$_2$—NH—R° wherein R° has the same meaning given above); acyl $$(-\overset{O}{\underset{\|}{C}}R°$$

wherein R° has the meaning given above); sulfonyl (—SO$_2$—R° wherein R° has the same meaning given above); sulfo; cyano; carboxy, hydroxy; amino including mono- and disubstituted amino (—NR'R'' wherein R' and R'' each are hydrogen, alkyl, aryl, alkaryl, or aralkyl and R' and R'' taken together represent the atoms necessary to complete a heterocyclic ring, such as piperidino, pyrrolidino, N-lower alkylpiperazino, morpholino, thiomorpholino and tetrahydro-2H,4H-1,3,6-dioxazocino or a fused ring system, e.g., quinolizidine) and perhalomethylcarbinol,

wherein R$^I$ is perhalomethyl, e.g., trifluoromethyl, difluoromethyl, difluorochloromethyl, dichlorofluoromethyl, dichloromethyl and trichloromethyl and R$^{II}$ is hydrogen or said perhalomethyl, usually the same as R$^I$.

Typical of the triarylmethane compounds of the present invention are those represented by the following formula

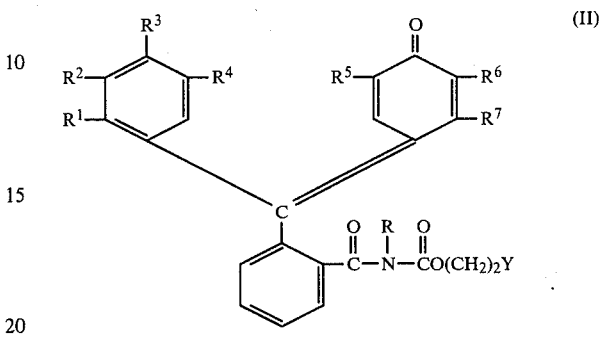

wherein R$^1$ is hydrogen, alkyl, alkoxy or hydroxy; R$^2$ and R$^4$ each are selected from hydrogen, alkyl, alkoxy, chloro and fluoro; R$^1$ and R$^2$ taken together represent the carbon atoms necessary to complete a fused benzene ring; R$^3$ is hydrogen; alkyl, alkoxy, hydroxy, -N,N-(dialkyl)amino, -N,N-(w-R$^8$alkyl)$_2$amino wherein R$^8$ is halo or hydroxy; piperidino, pyrrolidino, N-methylpiperazino, morpholino, thiomorpholino or tetrahydro-2H,4H-1,3,6-dioxazocino; R$^2$, R$^3$ and R$^4$ taken together represent the atoms necessary to complete a fused [ij]-quinolizidine ring; R$^5$ is hydroxy, alkyl, phenyl, alkoxy, chloro, fluoro or perhalomethylcarbinol; R$^6$ is hydrogen, alkyl, alkoxy, chloro or fluoro; R$^7$ is hydrogen, alkyl, alkoxy or hydroxy; R$^6$ and R$^7$ taken together represent the carbon atoms necessary to complete a fused benzene ring; R is an alkyl group or a phenyl group, unsubstituted or substituted with a solubilizing group and Y is an electron-withdrawing group.

By "solubilizing group" is meant a group that enhances the solubility of the compound in aqueous alkaline photographic processing solutions. Preferably, said solubilizing groups are —SO$_3$H, —COOH or —OH and said R is an alkyl group having 1 to 4 carbon atoms. The electron-withdrawing group, Y, preferably has a positive sigma value ($\sigma^-$) greater than 0.6. Preferred electron-withdrawing groups include nitro; cyano; —SO$_2$CH$_3$;

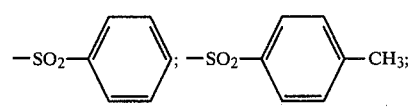

—COCH$_3$; and —SO$_2$N(CH$_2$Ph)$_2$. The sigma value for these and other groups, such as, —CHO, —COOH, —COOC$_2$H$_5$ and —CONH$_2$ have been reported by Eugen Müller, Methoden Der Organischen Chemie, Georg Thieme Verlag, Stuttgart, 1970, p. 78 in terms of $\sigma^-$ values based on the ionization of p-substituted phenols.

Usually, the alkyl and alkoxy substituents comprising R$^1$, R$^2$, R$^3$, R$^4$, R$^5$, R$^6$ and R$^7$ are lower alkyl having 1 to 4 carbon atoms, such as, methyl, ethyl, n-propyl, isopropyl and n-butyl and lower alkoxy having 1 to 4 carbon atoms, such as, methoxy, ethoxy, propoxy and butoxy. Also, the alkyl groups of the -N,N-(dialkyl- )amino and -N,N-(w-$R^8$alkyl)$_2$amino substituents usually are lower alkyl having 1 to 4 carbon atoms and $R^8$, when halo, is preferably chloro.

Specific examples of compounds within the scope of the present invention are as follows:

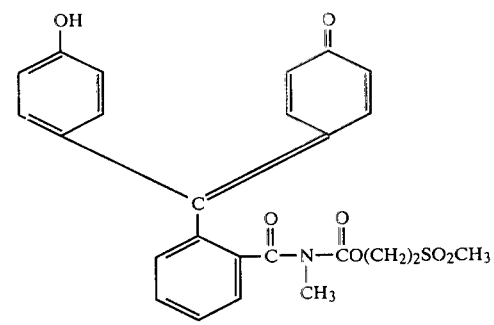
(1)

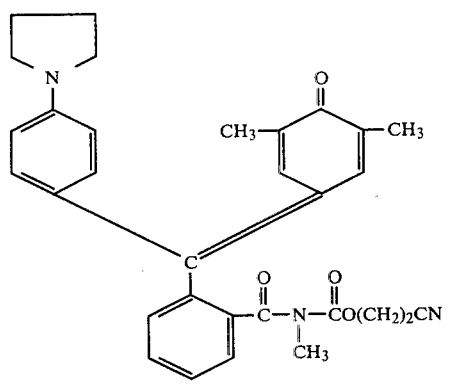
(2)

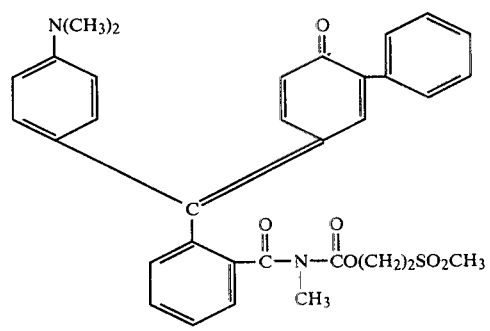
(3)

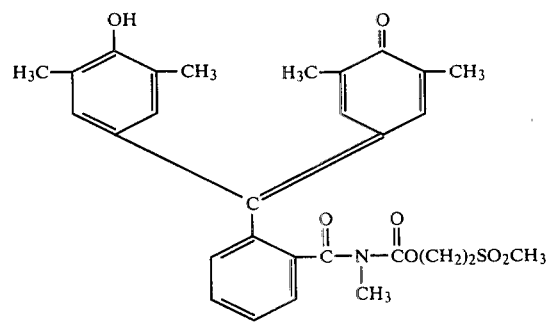
(4)

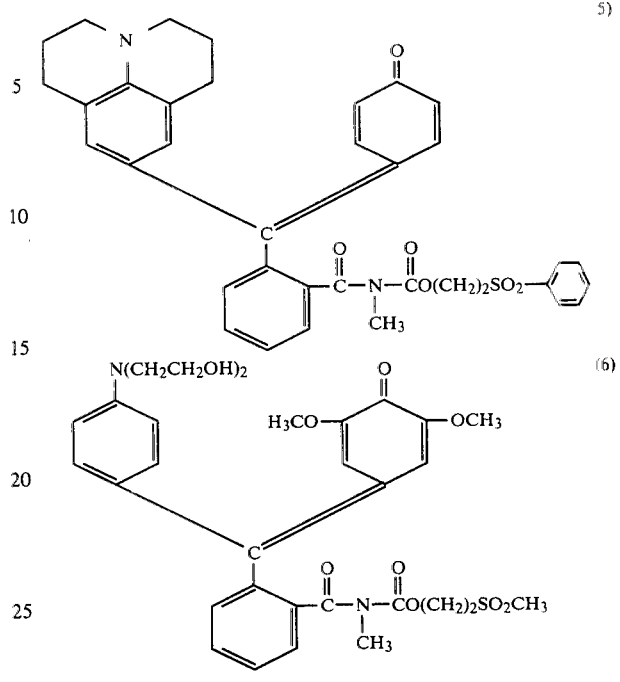

The compounds of the present invention may be prepared by reacting phenolphthalin with an excess of thionyl chloride to give the corresponding carbonyl chloride; reacting the carbonyl chloride with the selected amine, $RNH_2$, to give the corresponding monoamide; blocking the functional —OH and other —OH substituents with the appropriate protecting group; treating the protected compound with butyllithium and reacting with the selected chloroformate, $ClCO_2(CH_2)_2Y$, to give the leuco dye precursor; and after removing the protecting groups with weak acid, oxidizing the leuco dye with, for example, 2,3-dichloro-5,6-dicyano-1,4-benzoquinone to yield the dye product. This synthesis is illustrated below employing phenolphthalin as the starting material.

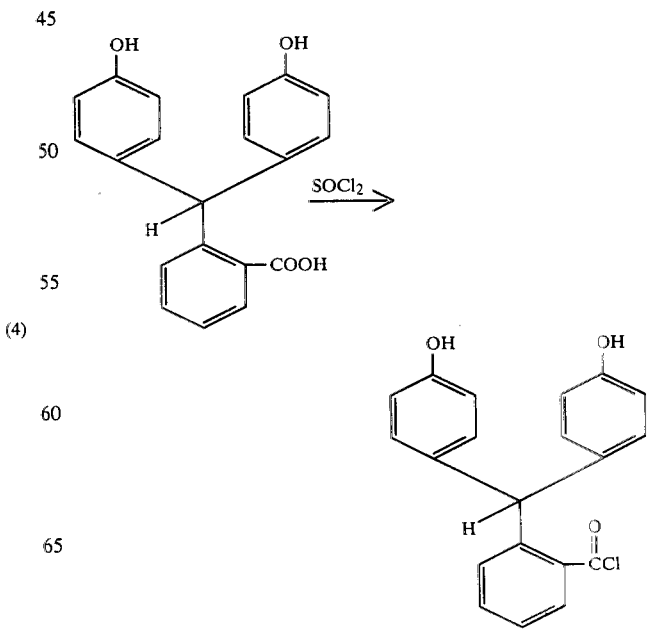

-continued

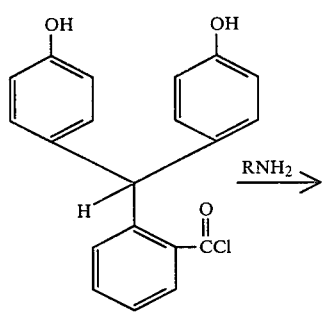

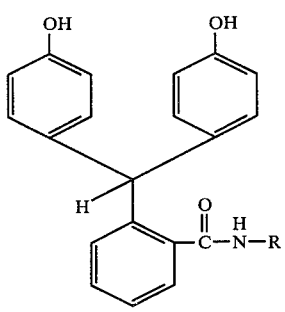

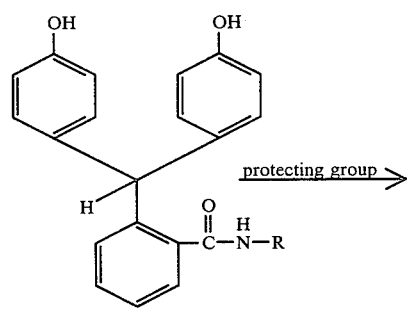

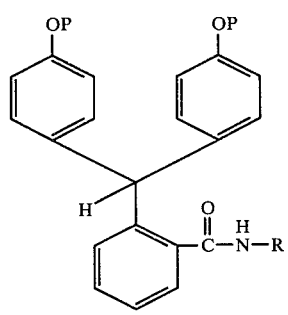

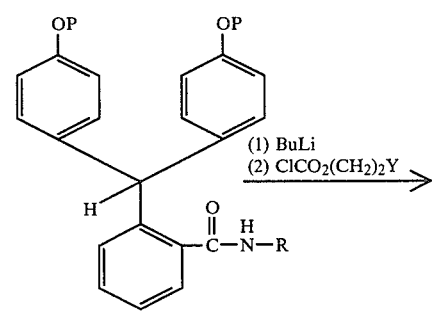

-continued

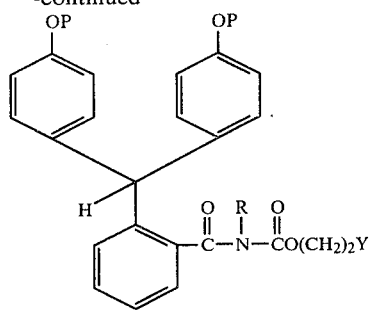

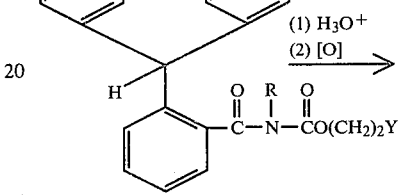

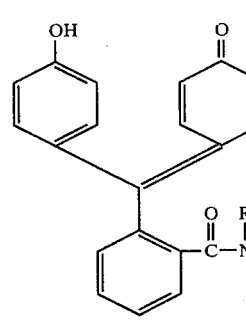

wherein R and Y have the same meaning given in formula I and P is a protecting group.

The phthaleins used as starting materials in preparing the subject compounds may be synthesized by treating the selected 3,3-disubstituted phthalide (phthalein) with sodium dithionite in aqueous sodium hydroxide solution to give the corresponding phthalin. The 3,3-disubstituted phthalides may be prepared using various methods known in the art. In one of the more conventional procedures, a phenol, such as, thymol, o-cresol and phenol itself are reacted with phthalic anhydride at elevated temperatures in the presence of a suitable catalyst such as zinc chloride or sulfuric acid to yield the corresponding symmetrical 3,3-disubstituted phthalide, i.e., wherein the 3,3 substituents are the same. Another method of synthesizing 3,3-disubstituted phthalides wherein the 3,3 substituents may be the same or different is disclosed and claimed in U.S. Pat. No. 3,931,228 to Alan L. Borror. In the latter method, a phenol or a 1-naphthol is reacted with phthalaldehydic acid to give the corresponding p-phthalidylphenol or p-phthalidylnaphthol adduct which is oxidized by dehydrogenation to selectively remove the hydrogen from the 3-position of the phthalidyl portion of the adduct and to remove the hydrogen from the phenolic or naphtholic hydroxy group. This oxidized intermediate is then condensed with a phenol, 1-naphthol, etc., preferably in the presence of an acid catalyst to yield the 3,3-disubstituted phthalide.

The chloroformates may be prepared in a known manner by reacting the selected HO(CH₂)₂Y with phosgene to give the corresponding

It will be appreciated that an appropriate blocking group may be selected from those commonly used for protecting the functional phenolic or naphtholic -OH of phenols and naphthols and other -OH substituents that may be present. As an illustration, blocked phenols and 1-naphthols may be prepared by methoxymethylation as described, for example, by Kaoru Fuji et al, *Synthesis*, 4, pp. 276–277 (1975), tetrahydropyranylation as described, for example, by William E. Parham et al, *J. Amer. Chem. Soc.*, 70, pp. 4187–4189 (1948) or by silylating with dimethyl-t-butylsilyl chloride in the presence of imidazole as described by E. J. Corey et al, *J. Amer. Chem. Soc.*, 94, pp. 6190–6191 (1972).

The following example is given to further illustrate the present invention and is not intended to limit the scope thereof.

EXAMPLE

Preparation of the compound having the formula

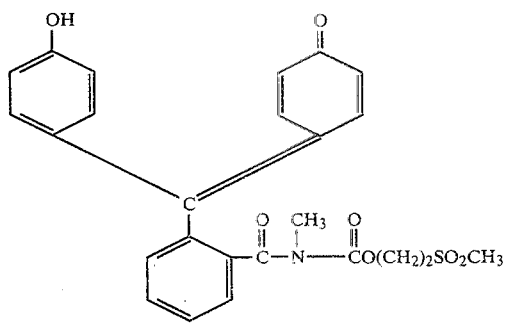

(a) The acid chloride of the formula

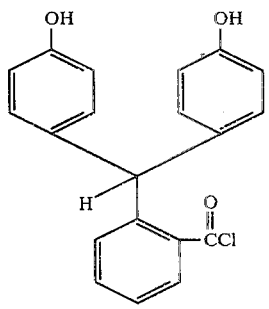

was prepared in quantitative yield by refluxing 10.0 g of phenolphthalin in excess thionyl chloride for two hours. Removal of thionyl chloride by distillation at atmospheric, then reduced pressure provided a viscous, yellow syrup used directly in the next step. (theoretical yield of acid chloride=10.2 g; the crude product weighed 15.1 g).

(b) A solution of 15.1 g of the crude acid chloride prepared in step (a) dissolved in ether was added dropwise to a cold ether solution of methyl amine (presaturated at 0° C.). Neutralization with hydrochloric acid, followed by two recrystallizations from aqueous ethanol gave 5.68 g of the corresponding amide, melting range 255°–258° C. Infrared and nmr spectra were consistent with, and supportive of, the desired structure.

(c) The phenolic functions of the amide prepared in step (b) were blocked by treating 5.68 g (0.017 mole) of the amide with 2.2 equivalents of t-butyldimethylsilyl chloride and 4.4 equivalents of imidazole in 60 ml of dry N,N-dimethylformamide at room temperature overnight. Reaction solids were collected by filtration and washed with water. Recrystallization from ethanol gave 5.0 g of the blocked product, melting range 175°–178° C. Infrared and nmr spectra were consistent with, and supportive of, the desired structure.

(d) The blocked compound prepared in step (c), 3.89 g (0.007 mole) was treated with 1.2 equivalents of n-butyllithium in dry tetrahydrofuran at −65° C. This cold solution was added to a cold (−65° C.) solution of 1.5 equivalents of the chloroformate, ClCO₂(CH₂)₂SO₂CH₃, also in dry tetrahydrofuran. Work-up, including high pressure column chromatography, provided 1.23 g (25% yield) of the compound

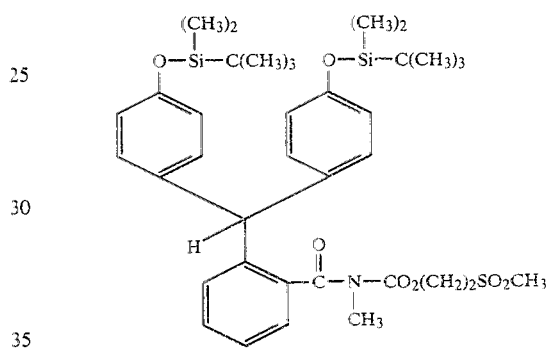

as a straw syrup. Infrared and nmr spectra were consistent with, and supportive of, the desired structure.

(e) The compound prepared in step (d) was reacted with methanolic hydrogen chloride at room temperature overnight to effect the desired cleavage of the silyloxy protecting groups. The deblocked compound was obtained as a white solid, 0.41 g (50% yield). Infrared and nmr spectra were consistent with, and supportive of, the assigned structure.

(f) Oxidation of the deblocked compound of step (e) with 2,3-dichloro-5,6-dicyano-1,4-benzoquinone followed by work-up which included intermediate pressure column chromatography gave the title compound as an amorphous orange solid. This material was further purified using preparative TLC (silica gel/95:5 CH₂Cl₂:MeOH). Infrared and nmr spectra were consistent with, and supportive of, the assigned structure.

The title compound gave yellow solutions in methanol and acetone. Addition of aqueous base (1 N NaOH) instantly produced magenta coloration, which rapidly and irreversibly bleached to colorless.

A sample of an acetone solution of the purified dye compound was added to fresh pH=12 buffer and the first half-life (T ½) and the second half-life (T ½) were measured giving the following results wherein OD refers to optical density. By T ½ is meant the time measured for one-half of said colored compound to decolorize.

Experiment 1
  1st T ½ = 10.0 sec.
  2nd T ½ = 8.5 sec.

Initial OD≅2.20 extrapolated from OD=2.00 at 1.5 sec.
Final OD=0.02
Experiment 2
1st T ½=9.5 sec.
2nd T ½=8.5 sec.
Initial OD=1.15 extrapolated from OD=0.90 at 3.0 sec.
Final OD=0.01

The λmax of the pure title compound was 560 nm as measured in acetone—pH 12 buffer—and the T ½ values were measured at this wavelength.

As noted previously, the compounds of the present invention are useful in photographic products and processes as light-screening dyes, for example, antihalation or color correction filter dyes and may be employed in a conventional manner in the appropriate layer or layers of a photosensitive film unit. The use of the subject compounds as photographic light-screening dyes is disclosed and claimed in copending U.S. patent application Ser. No. 152,189 of James W. Foley filed concurrently herewith, said application being a continuation-in-part of U.S. patent application Ser. No. 106,520 filed Dec. 26, 1979. For convenience, the specification of Ser. No. 152,189 is specifically incorporated herein.

As discussed above and also in the aforementioned application, the subject compounds have the ability to decolorize completely and irreversibly in base by undergoing an irreversible cleavage reaction within a predetermined time at a predetermined pH to give a new colorless compound which remains colorless at the pH's normally encountered during processing subsequent to "bleaching" so that the new compound may be retained in a photographic film unit, e.g., a photosensitive element without the possibility of color reappearing in time. In this regard, a sample of the title compound dissolved in methanol was treated with aqueous 1 N NaOH, and after decolorization, the cleavage product was compared to a known sample and was found to be the same.

The dye compound of the Example also was incorporated into the image-receiving layer 3 of an image-receiving component comprising the structure set forth below by dissolving the yellow dye in methanol and mixing the yellow methanol solution with a solution of the graft copolymer and coating this mixture on top of the timing layer to complete the image-receiving component. A clear, light yellow film was produced.

A transparent 4 mil polyethylene terephthalate film base coated with, in succession:

1. as a polymeric acid layer, a mixture of about 9 parts of a partial butyl ester of polyethylene/maleic anhydride copolymer and 1 part of polyvinyl butyral coated at a coverage of about 2,500 mgs./ft.²;
2. a timing layer containing a 14:1 ratio of a 60-30-4-6 tetrapolymer of butylacrylate, diacetone acrylamide, styrene and methacrylic acid and polyvinyl alcohol at a coverage of 500 mgs./ft.²;
3. a graft copolymer of 4-vinylpyridine and vinylbenzyltrimethylammoniumchloride grafted on hydroxyethyl cellulose in a weight ratio of 2.2/1/2.2, respectively, coated at a coverage of 300 mgs./ft.² to provide an image-receiving layer and containing the dye compound prepared in the above Example.

A sample of the image-receiving component was placed on a piece of clear Mylar film with water in between and the reflection densities for red (R), green (G) and blue (B) were recorded on a reflectance densitometer. After measuring the densities, a drop of aqueous 1 N NaOH was applied to the image-receiving component. A magenta color appeared and quickly bleached leaving a colorless ("to the eye") film. A faint milky appearance disappeared as the film dried. The reflection densities were again recorded for red (R), green (G) and blue (B). The results are set forth below.

| Reflection Densities* | | | | | |
|---|---|---|---|---|---|
| Before Bleaching | | | After Bleaching | | |
| R | G | B | R | G | B |
| 0.02 | 0.03 | 0.20 | 0.01 | 0.01 | 0.03 |

*The densitometer was calibrated using two pieces of clear Mylar film with water between: R=0.00; G=0.00; B=0.01.

In addition to their utility as photographic light-screening dyes, the subject compounds may be used as a means for detecting the presence of alkali and also may be used in a validation or verification system, e.g., for documents by using their ability to decolorize within a predetermined time at a predetermined alkaline pH. For the latter and other related uses, the subject dyes may be employed to provide a particular pattern or symbol by treating a layer of the dye with an aqueous alkaline solution applied in an imagewise fashion to give the desired pattern or configuration.

Since certain changes may be made in the above product without departing from the scope of the invention herein involved, it is intended that all matter contained in the above description shall be interpreted as illustrative and not in a limiting sense.

What is claimed is:

1. A compound of the formula

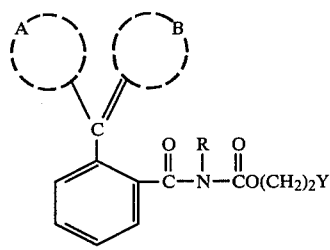

wherein A is a phenyl moiety or a naphthyl moiety; B is a 4'-oxo-1'-phenylidene moiety or a 4'-oxo-1'-naphthylidene moiety; R is an alkyl group or a phenyl group, unsubstituted or substituted with a solubilizing group, and Y is an electron-withdrawing group.

2. A compound as defined in claim 1 wherein said A is a phenyl moiety.

3. A compound as defined in claim 2 wherein said B is a 4'-oxo-1'-phenylidene moiety.

4. A compound as defined in claim 1 wherein said R is alkyl.

5. A compound of the formula

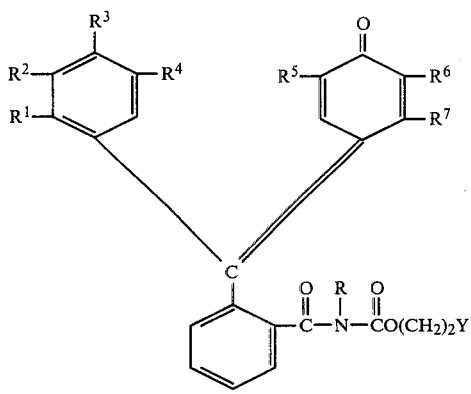

wherein $R^1$ is hydrogen, alkyl, alkoxy or hydroxy; $R^2$ and $R^4$ each are selected from hydrogen, alkyl, alkoxy, chloro and fluoro; $R^1$ and $R^2$ taken together represent the carbon atoms necessary to complete a fused benzene ring; $R^3$ is hydrogen, alkyl, alkoxy, hydroxy, -N,N-(dialkyl)amino, -N,N-(w-$R^8$alkyl)$_2$amino wherein $R^8$ is halo or hydroxy; piperidino, pyrrolidino, N-methylpiperazino, morpholino, thiomorpholino or tetrahydro-2H,4H-1,3,6-dioxazocino; $R^2$, $R^3$ and $R^4$ taken together represent the atoms necessary to complete a fused [ij]-quinolizidine ring; $R^5$ is hydroxy, alkyl, phenyl, alkoxy, chloro, fluoro or perhalomethylcarbinol; $R^6$ is hydrogen, alkyl, alkoxy, chloro or fluoro; $R^7$ is hydrogen, alkyl, alkoxy or hydroxy; $R^6$ and $R^7$ taken together represent the carbon atoms necessary to complete a fused benzene ring; R is an alkyl group or a phenyl group, unsubstituted or substituted with a solubilizing group; and Y is an electron-withdrawing group.

6. A compound as defined in claim 5 wherein said $R^3$ is hydroxy.

7. A compound as defined in claim 5 wherein said R is alkyl.

8. A compound as defined in claim 5 wherein said Y is an electron-withdrawing group having a positive sigma value greater than 0.6 as defined by Hammett's Equation.

9. The compound

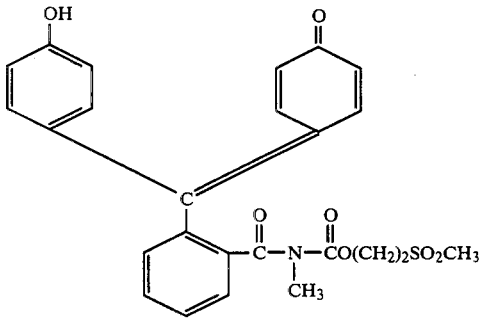

* * * * *